US008517892B2

(12) United States Patent
Schulte et al.

(10) Patent No.: US 8,517,892 B2
(45) Date of Patent: Aug. 27, 2013

(54) METHOD AND APPARATUS FOR CONTROLLING HYBRID ELECTRIC VEHICLES

(75) Inventors: Jurgen Schulte, Vestal, NY (US); Filippo Muggeo, Endwell, NY (US); Derek Matthews, Vestal, NY (US); Brendan Pancheri, Binghamton, NY (US); Erin Hissong, Vestal, NY (US)

(73) Assignee: BAE SYSTEMS Controls Inc., Johnson City, NY (US)

( * ) Notice: Subject to any disclaimer, the term of this patent is extended or adjusted under 35 U.S.C. 154(b) by 0 days.

(21) Appl. No.: 13/205,166

(22) Filed: Aug. 8, 2011

(65) Prior Publication Data
US 2013/0040778 A1 Feb. 14, 2013

(51) Int. Cl.
*B60W 10/08* (2006.01)
(52) U.S. Cl.
USPC ............................................................ 477/5
(58) Field of Classification Search
USPC ............................................... 701/22; 477/5
See application file for complete search history.

(56) References Cited

U.S. PATENT DOCUMENTS

| | | | |
|---|---|---|---|
| 5,667,029 A | 9/1997 | Urban et al. | |
| 5,735,770 A * | 4/1998 | Omote et al. | 477/5 |
| 5,820,172 A | 10/1998 | Brigham et al. | |
| 5,842,534 A | 12/1998 | Frank | |
| 6,018,198 A * | 1/2000 | Tsuzuki et al. | 290/17 |
| 6,116,363 A | 9/2000 | Frank | |
| 6,176,808 B1 * | 1/2001 | Brown et al. | 477/5 |
| 6,336,889 B1 * | 1/2002 | Oba et al. | 477/5 |
| 6,543,565 B1 * | 4/2003 | Phillips et al. | 180/165 |
| 6,581,705 B2 * | 6/2003 | Phillips et al. | 180/65.25 |
| 6,607,467 B2 * | 8/2003 | Tabata | 477/33 |
| 6,629,024 B2 * | 9/2003 | Tabata et al. | 701/22 |
| 6,746,366 B2 | 6/2004 | Tamor | |
| 6,846,265 B2 * | 1/2005 | Yamamoto et al. | 477/3 |
| 6,868,674 B2 * | 3/2005 | Tabata et al. | 60/706 |
| 7,055,635 B2 * | 6/2006 | Itoh et al. | 180/65.25 |
| 7,100,720 B2 * | 9/2006 | Ishikawa | 180/65.26 |
| 7,243,010 B2 * | 7/2007 | Tabata et al. | 701/22 |
| 7,351,182 B2 * | 4/2008 | Kobayashi | 477/5 |
| 7,370,715 B2 * | 5/2008 | Colvin et al. | 180/65.28 |
| 7,647,997 B2 * | 1/2010 | Oliver | 180/165 |
| 7,654,931 B2 * | 2/2010 | Popp et al. | 477/4 |
| 7,758,467 B2 * | 7/2010 | Ashizawa et al. | 477/5 |
| 7,806,801 B2 * | 10/2010 | Gohring et al. | 477/5 |
| 7,848,867 B2 * | 12/2010 | Ueno | 701/70 |
| 7,878,281 B2 * | 2/2011 | Tanishima | 180/65.265 |
| 7,938,209 B2 * | 5/2011 | Dilzer et al. | 180/65.28 |
| 8,047,959 B2 * | 11/2011 | Fuechtner et al. | 477/5 |

(Continued)

FOREIGN PATENT DOCUMENTS

| | | |
|---|---|---|
| JP | 2007126081 A | 5/2007 |
| JP | 2008179242 A | 8/2008 |
| JP | 2008273460 A | 11/2008 |

*Primary Examiner* — Dirk Wright
(74) *Attorney, Agent, or Firm* — Scully, Scott, Murphy & Presser PC

(57) ABSTRACT

A method for operating an engine and an integrated starter/generator/motor (ISGM) disposed in a hybrid electric vehicle, which includes launch and deceleration processes. The ISGM is used to both launch the vehicle and start the engine. The deceleration process includes operating a first clutch to disengage the engine from the ISGM during an initial phase, and engaging a second clutch during the initial phase to direct substantially all regenerative energy to provide the only source of electrical energy to recharge the energy storage device.

25 Claims, 13 Drawing Sheets

(56) References Cited

U.S. PATENT DOCUMENTS

| | | | |
|---|---|---|---|
| 8,116,957 B2* | 2/2012 | Oh et al. | 701/67 |
| 8,142,328 B2* | 3/2012 | Reuschel | 477/6 |
| 8,192,324 B2* | 6/2012 | Kraska et al. | 477/5 |
| 8,219,271 B2* | 7/2012 | Fleckner | 701/22 |
| 8,246,509 B2* | 8/2012 | Mittelberger et al. | 477/5 |
| 8,337,362 B2* | 12/2012 | Inagaki et al. | 477/175 |
| 2001/0011050 A1 | 8/2001 | Yamaguchi et al. | |
| 2002/0052677 A1 | 5/2002 | Lasson et al. | |
| 2002/0065165 A1 | 5/2002 | Lasson | |
| 2002/0065589 A1 | 5/2002 | Ostberg | |
| 2004/0206325 A1 | 10/2004 | Momcilovich et al. | |
| 2006/0016627 A1 | 1/2006 | Robertson | |
| 2006/0237247 A1 | 10/2006 | Severinsky et al. | |
| 2007/0078580 A1 | 4/2007 | Cawthorne et al. | |
| 2007/0102208 A1* | 5/2007 | Okuda et al. | 180/65.3 |
| 2008/0125265 A1 | 5/2008 | Conlon et al. | |
| 2008/0127935 A1 | 6/2008 | Park | |
| 2008/0182722 A1 | 7/2008 | Colvin et al. | |
| 2008/0185198 A1 | 8/2008 | Jones | |
| 2008/0300743 A1 | 12/2008 | Conlon et al. | |
| 2009/0076672 A1 | 3/2009 | Bajwa | |
| 2009/0124450 A1 | 5/2009 | Silveri et al. | |

* cited by examiner

METHOD AND APPARATUS FOR CONTROLLING HYBRID ELECTRIC VEHICLES

CROSS-REFERENCE TO RELATED APPLICATIONS

This application is related to co-pending application entitled Parallel Hybrid Electric Vehicle Power Management System and Adaptive Power Management Method and Program Therefor assigned to BAE Systems Controls Inc., the entirety of which is incorporated by reference

FIELD OF THE INVENTION

The present invention relates generally to hybrid electric vehicles more specifically, the present invention relates to a system and method for controlling components for a hybrid electric vehicle during engine starting, vehicle launch and deceleration.

BACKGROUND OF THE DISCLOSURE

Engine management is an important aspect for increasing efficient energy usage in hybrid vehicles. This importance is magnified during vehicle launch because an engine is not efficient during launch. Additionally, engine management in a single machine parallel hybrid vehicle poses the challenge that a single electric machine needs to provide the necessary starting torque for the engine while at the same time propelling the vehicle.

SUMMARY OF THE DISCLOSURE

Accordingly, disclosed is a method of controlling the operation of a parallel hybrid electric vehicle. The parallel hybrid electric vehicle comprises an engine, a first clutch, an integrated starter/generator/motor (ISGM) coupled to the engine in accordance with the operating state of the first clutch, a combination of a torque converter and a second clutch connected in parallel therewith, this combination being mechanically coupled between the ISGM and an output drive shaft that propels the vehicle, and an energy storage device electrically coupled to the ISGM. The method comprises transmitting electrical energy from the energy storage device to the ISGM, the ISGM functions as a motor having an output torque, transmitting a portion of the output torque from the ISGM through the torque converter to the output drive shaft to launch the vehicle, and operating the first clutch to enable a remaining portion of the output torque of the ISGM to be coupled to the engine to enable the starting of the engine. Prior to transmitting electrical energy, a release of the service brakes is detected or a launch event is detected.

When transmitting electrical energy, the ISGM is accelerated to a predefined percentage of the idle speed of the engine.

The parallel hybrid electric vehicle also has a gear box positioned between the combination and the output drive shaft. After starting the engine, an output torque from the engine is combined with the output torque from the ISGM as the combined torques which are transmitted through the torque converter and the gear box to the output drive shaft to accelerate the launching of the vehicle.

The second clutch can be lock-up clutch. After the launched vehicle reaches a first threshold speed, the lock-up clutch is engaged to enable the output torque from the engine and the ISGM to be coupled through the lock-up clutch and the gear box to the output drive shaft to provide sufficient power to further accelerate the vehicle.

Also disclosed is a method for operating an engine in a parallel hybrid vehicle comprising an engine, a first clutch, an integrated starter/generator/motor (ISGM) coupled to the engine in accordance with the operating state of the first clutch, a combination of a torque converter and a second clutch connected in parallel therewith, the combination being mechanically coupled between the ISGM and an output drive shaft that propels the vehicle, and an energy storage device electrically coupled to the ISGM. The method comprises operating the first clutch to disengage the engine from the ISGM during an initial deceleration phase of a vehicle, and engaging the second clutch during the initial deceleration phase to direct substantially all regenerative energy from the decelerating vehicle therethrough to the ISGM operating as a generator to provide the only source of electrical energy to recharge the energy storage device, and disengaging the second clutch at the later deceleration phase to direct any remaining regenerative energy through the torque converter.

The method further comprises maintaining the ISGM at an idle speed during the later deceleration phase.

The method further comprises defueling the engine during a final deceleration phase in which the velocity is at zero.

Also disclosed is an engine control system for a parallel hybrid vehicle. The control system comprises an internal combustion engine, a first clutch, an integrated starter/generator/motor (ISGM) coupled to the internal combustion engine by way of the first clutch, a rechargeable energy storage system providing electrical energy to the ISGM, a gearbox coupled to an output drive shaft of the vehicle, a torque converter mechanically coupled between the ISGM and the gearbox, a lock-up clutch disposed in parallel with the torque converter, the lock-up clutch having an operation mode in which actuation of the lock-up clutch is controlled independent of operational conditions of the torque converter, a controller adapted for generating control signals. The control signals control operation of the lock-up clutch by way of the operation mode, the ISGM, said first clutch, and said internal combustion engine. The controller operates said first clutch to disengage the engine from the ISGM during an initial deceleration phase of the vehicle. The controller further engages the lock-up clutch during the initial deceleration phase to direct substantially all regenerative energy from the decelerating vehicle therethrough to the ISGM operating as a generate to provide the only source of electric energy to recharge the rechargeable energy storage system, and disengages the lock-up clutch at the later deceleration phase of the vehicle to direct any remaining regenerative energy through the torque converter.

The controller transmits electrical energy from the rechargeable energy storage system to the ISGM, where the ISGM functions as a motor having an output torque, disengages the lock-up clutch (if necessary) to couple a portion of the output torque from the ISGM through the torque converter to the output drive shaft to launch the vehicle, and operates the first clutch to enable a remaining portion of the output torque of the ISGM to be coupled to the engine to enable the starting of the engine when launching the vehicle.

The lock-up clutch is actuated by control of one or more control devices electronically controlled by the control signals received from the controller.

The ISGM is adapted to operate as a starter during an engine launch operation of a vehicle, as a generator during deceleration of the vehicle, and as a primary traction motor during acceleration and cruising of the vehicle.

The rechargeable energy storage system includes at least one of a battery, or a fuel cell.

Also disclosed is a method for operating an engine in a parallel hybrid electric vehicle. The parallel hybrid vehicle comprises at least an engine, a first clutch, an integrated starter/generator/motor (ISGM) coupled to the engine in accordance with the operating state of the first clutch, and an energy storage device electrically coupled to the ISGM. The method comprises operating the first clutch to disengage the engine from the ISGM during an initial deceleration phase of a vehicle and directing substantially all regenerative energy from the decelerating vehicle therethrough to the ISGM operating as a generator to provide the only source of electrical energy to recharge the energy storage device at a first deceleration phase.

The method further comprises operating the first clutch to couple the engine to the ISGM at a later deceleration phase in which a velocity is below a threshold velocity.

The method further comprises using the ISGM to decelerate the engine.

Also disclosed is a method of controlling the operation of a parallel hybrid electric vehicle. The hybrid electric vehicle comprises at least an engine, a first clutch, an integrated starter/generator/motor (ISGM) coupled to the engine in accordance with the operating state of the first clutch, and an energy storage device electrically coupled to the ISGM. The method comprises transmitting electrical energy from the energy storage device to the ISGM using only energy recovered via regenerative energy from deceleration of the parallel hybrid electric vehicle, wherein the ISGM functions as a motor having an output torque, transmitting a portion of the output torque from the ISGM to the output drive shaft to launch the vehicle and operating the first clutch to enable a remaining portion of the output torque of the ISGM to be coupled to the engine to enable the starting of the engine.

The method further comprises detecting a launch event.

During transmitting electrical energy, the ISGM is accelerated to a predefined percentage of the idle speed of the engine.

The operating the first clutch occurs when the ISGM is accelerated to a predefined percentage of the idle speed of the engine.

Further, the operating the first clutch can occur prior to the ISGM being accelerated to a predefined percentage of the idle speed of said engine. The method further comprises controlling a fuel supply to the engine at least based upon the acceleration of said ISGM.

The method further comprises receiving a torque command and comparing the received torque command with a peak torque of the ISGM. The operating of the first clutch is based upon the comparing.

The method further comprises accelerating the ISGM until a second predefined percentage of idle speed of the engine. The controlling of the fueling is performed after the ISGM reaches the second predefined percentage of idle speed of the engine.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF DISCLOSURE

Figure 1:
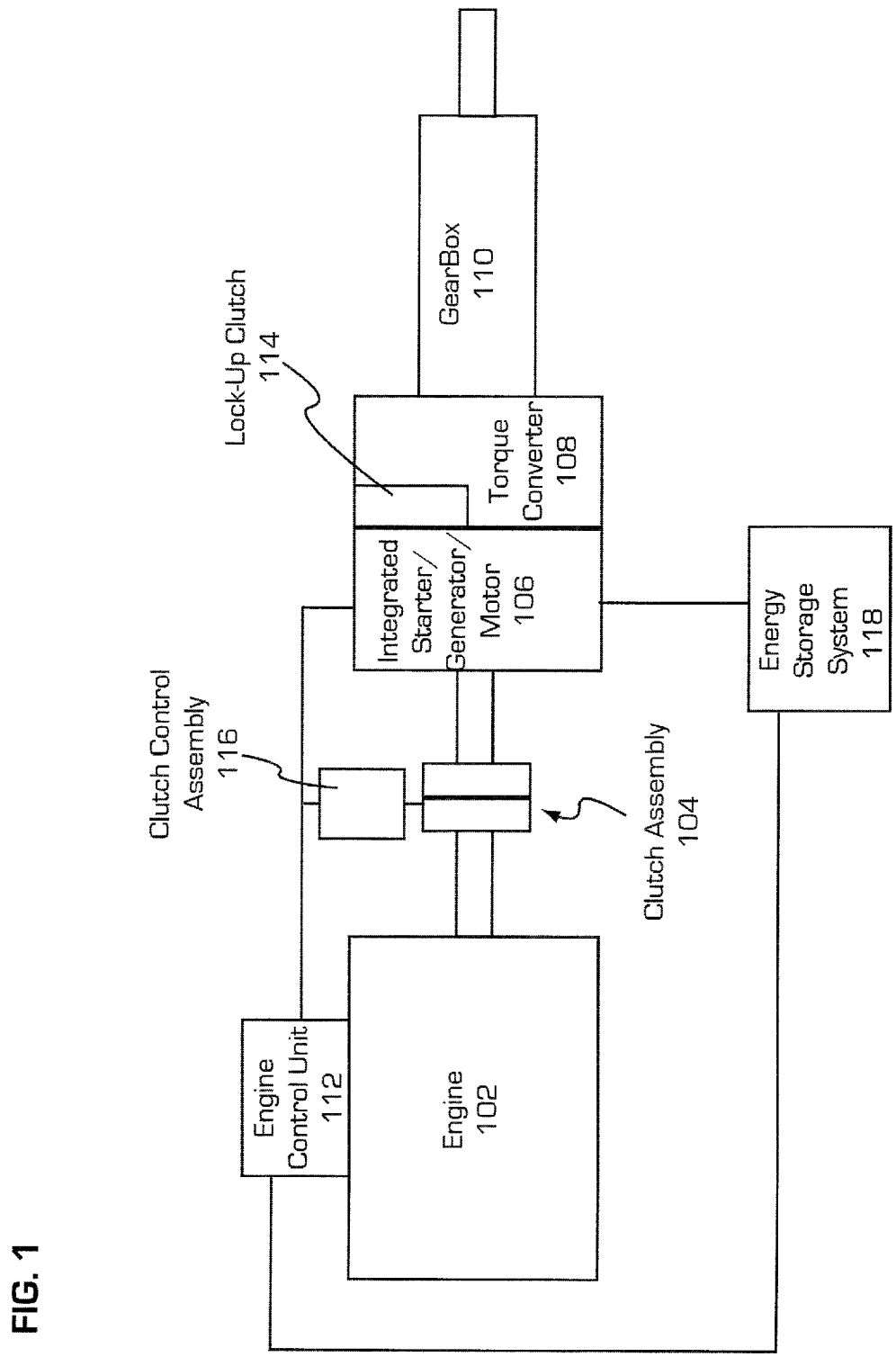
FIG. 1 illustrates a block representation of an example system of the present invention.

Referring to FIG. 1 an example of the present invention is shown. The drive train system of the present invention includes an internal combustion engine 102 (the "engine"), coupled to an integrated starter/generator/motor (ISGM) 106 by way of a clutch assembly 104. The clutch assembly 104 allows the ISGM 106 to be disengaged from the engine 102 during decelerations and full stops. The clutch assembly 104 is controlled by a clutch control assembly 116. The clutch control assembly 116 is, for example, a hydraulic solenoid controlling engagement and disengagement of the clutch assembly 104 based on the state of the hybrid vehicle. Additionally, the clutch control assembly 116 can be pneumatic or mechanical. In the present invention, the clutch assembly 104 disengages the engine 102 from the ISGM 106 during decelerations.

Additionally, a torque converter 108 is provided between the ISGM 106 and the gearbox 110. The gearbox 110 is coupled to drive wheels by way of a drive shaft (not shown).

The ISGM 106 is sized to operate efficiently as a traction motor for propelling the vehicle with or without engine assistance up to a cruising velocity. In addition, the ISGM 106 is adapted to provide sufficient rotational torque to rotate the engine crankshaft and propel the vehicle simultaneously.

Moreover, the ISGM 106 operates as a starter at engine launch and to launch the vehicle, as a generator during vehicle deceleration, and as a traction motor during acceleration and cruising. As a generator, the ISGM 106 generates electrical energy during the deceleration process by recuperating from regenerative braking the mechanical energy of the vehicle. The ISGM 106 is electrically coupled to an energy storage system 118, which may be batteries or fuel cells or ultra capacitors. Co-pending application entitled a Parallel Hybrid Electric Vehicle Power Management System and Adaptive Power Management Method and Program Therefor assigned to BAE Systems Controls, Inc., which is incorporated by reference describes a system and method for charging the energy storage system 118 only using energy from regenerative braking. The energy storage system 118 receives electrical energy from the ISGM 106 operating as a generator during deceleration. The energy storage system 118 provides electrical energy to the ISGM 106 when the ISGM 106 is operating as a starter motor and/or traction motor. Torque from the engine 102 and ISGM 106 is mechanically coupled to the torque converter 108.

Additionally, a lock-up clutch 114 can be integrally disposed within a torque converter 108. The lock-up clutch 114 can be electronically controlled. The lock-up clutch can be engaged and disengaged depending on a velocity.

The engine control unit 112 provides control signals for actuating fuel injectors, fuel pumps and other engine components. Additionally, the engine control unit 112 monitors engine operating conditions, and may be configured to control operation of the clutch assembly 104 and ISGM 106 based on sensor signals from accelerator and brake pedals in the vehicle cabin. Moreover, the engine control unit 112 provides control signals to the clutch control assembly 116.

Figure 2A:
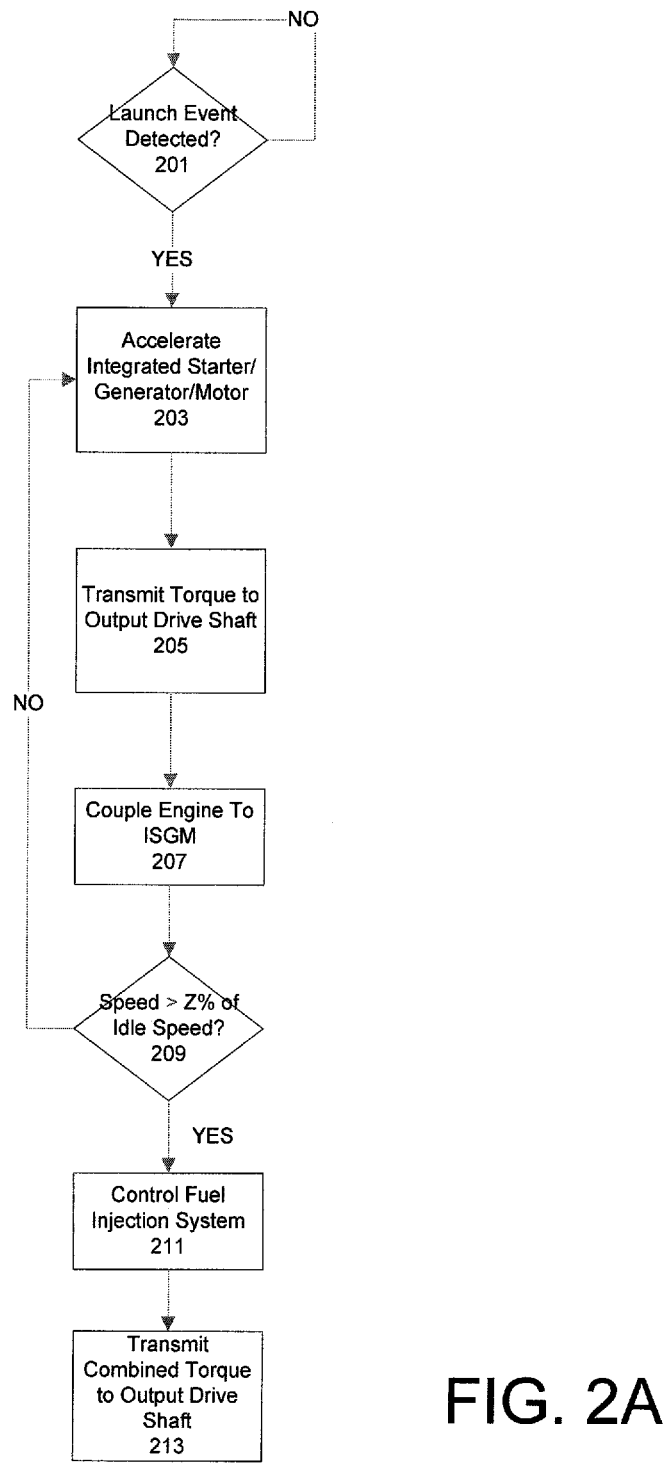
FIGS. 2A-2E illustrate flow diagrams illustrating a plurality of exemplary process for launching a vehicle in accordance with an aspect of the present invention.

Turning to FIG. 2A, a flow diagram showing an exemplary a vehicle launch process in accordance with the present invention is provided. As shown, the vehicle launch process begins at step 201 when a launch event is sensed or detected. A launch event includes a release of the service brakes or a detection of a request for acceleration from a driver, such as a torque command, or the like. The service brake, for purposes of the present invention, can include any mechanical braking mechanisms, such as, but not limited to foot pedal actuated brakes and hand/emergency brakes.

Once a launch event is detected, a controller, such as the engine control unit 112, accelerates the ISGM 106 in step 203 by transmitting electrical energy from the energy storage system 118 to the ISGM 106. The controller can be a separate controller from the engine control unit 112. However, for purposes of the description the controller and engine control unit 112 are used interchangeably. At step 205, torque is transmitted to the output shaft. In this example, the torque is transmitted via the torque converter 108. However, as will be described herein later with respect to the other examples, the torque can be transmitted via computer or manually operated clutches. Since the ISGM 106 is coupled to the torque converter 108, the vehicle begins moving at step 203, instantaneously with the acceleration of the ISGM 106.

At step 207, the ISGM 106 is coupled to the engine 202. A portion of the power or output torque of the ISGM 106 is coupled to the engine 102 by engaging the clutch assembly 104 to enable the starting of the engine 102 when launching the vehicle.

The ISGM 106 is accelerated until the controller determines in step 209 that the ISGM 106 is operating at a predetermined percentage above the engine idle speed. The coupling of the engine 102 and ISGM 106 is maintained. For example, the predetermined percentage may be 130% above engine idle speed. In step 211, the controller controls the fuel injection system of the engine 102. At this point, the engine 102 is fueled and begins to support vehicle launch. After the starting of the engine 102 via the fuel injection system, an output torque from the engine 102 is combined with the output torque from the ISGM 106 as the combined torques are transmitted through the torque converter and the gear box 110 to the output drive shaft to accelerate the launching of the vehicle at step 213.

In the system illustrated in FIG. 1, the lock-up clutch 114 is disengaged during the initial launch process shown in FIG. 2. The lock-up clutch 114 is not engaged until vehicle components are traveling at a predetermined speed, for example, transmission input speed in excess of 750 revolutions per minute. The speed as used herein and in the figures can be, but is not limited to, transmission input speed, transmission output speed, ISGM speed or vehicle speed. However, with respect to steps 317 and 719 as described below, the ISGM speed is not needed. The actually predetermined speed for engaging the lock-up clutch 114 can be based upon fuel efficiency and torque characteristics of the engine, and the like. According to this example, during the initial launch process, the power from the ISGM 106 and/or engine 102 is directed through the torque converter 108 alone to launch the vehicle.

Figure 2B:
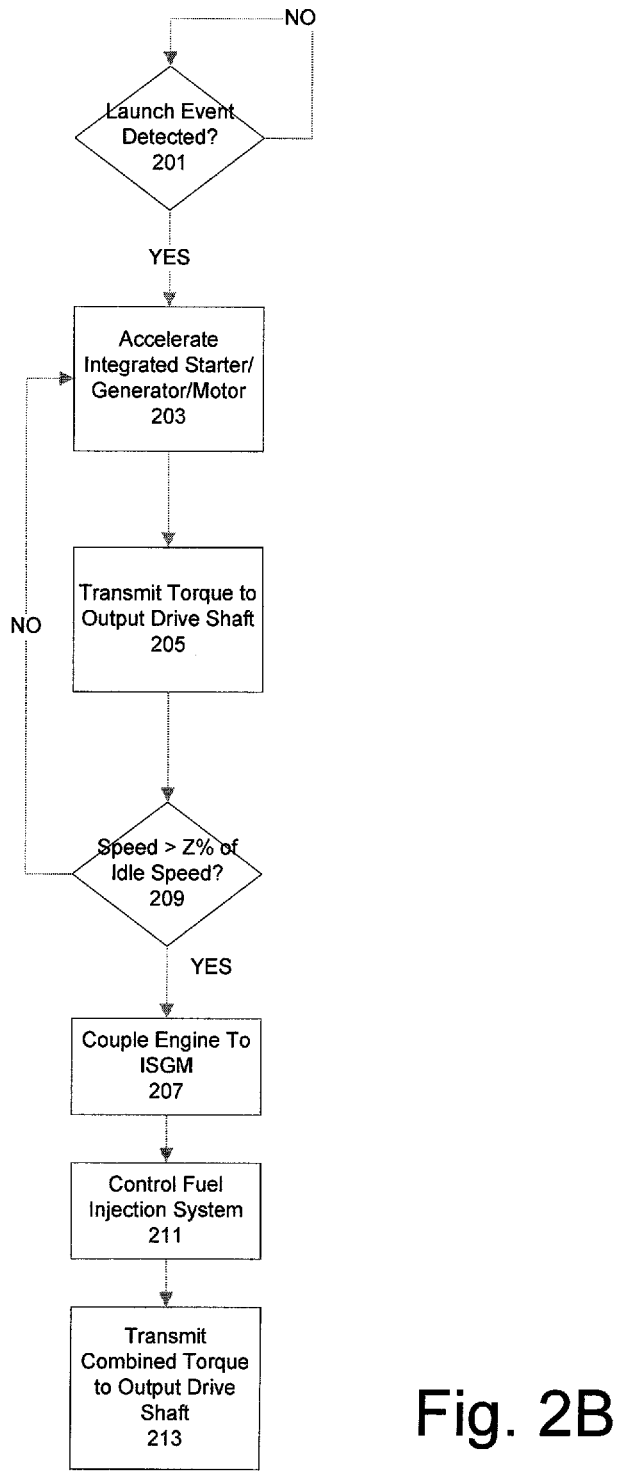

The present example may be configured in several alternative configurations during the initial launch, prior to step 203. For example, both the clutch assembly 104 and the lock-up clutch 114 may be engaged, both the clutch assembly 104 and the lock-up clutch 114 may be disengaged, the clutch assembly 104 may be engaged with the lock-up clutch 114 disengaged, or the clutch assembly 104 may be disengaged and the lock-up clutch 114 engaged. As depicted in FIG. 2A, the engine 102 is coupled to the ISGM 106 prior to the speed of the ISGM 106 reaching a predetermined percentage of the engine idle speed. However, in accordance with the invention, the coupling of the ISGM 106 to the engine 102 can occur after the speed of the ISGM 106 reaches a predetermined percentage of the engine idle speed as illustrated in FIG. 2B. The order of steps 207 and 209 is reversed. The remaining steps are the same and will not be described in detail again.

Figure 2C:
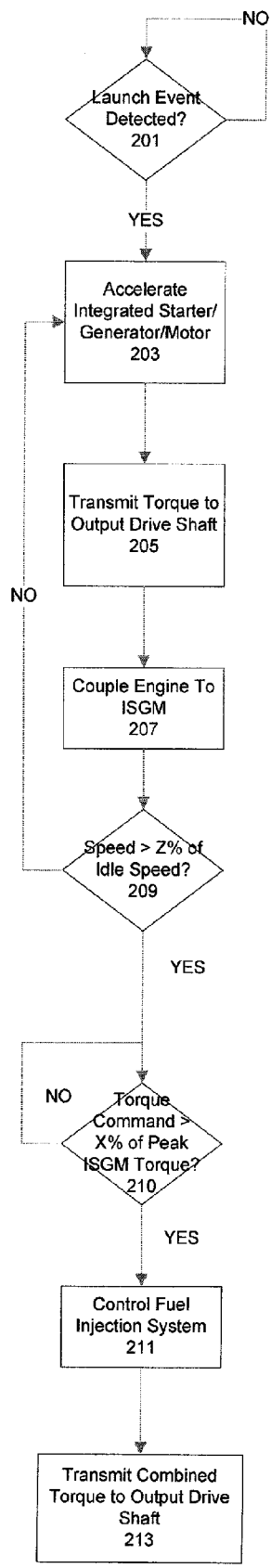

Additionally, a received torque command and the maximum or peak torque for the ISGM 106 can be used to determine when to couple the engine 102 to the ISGM 106 or when to refuel or fuel the engine 102. The peak torque is an ISGM 106 specific parameter. The peak torque threshold is a percentage of the peak torque. FIG. 2C illustrates a flow chart of an exemplary method where the torque command is compared with the peak ISGM torque to determine when the fuel injection system is controlled. At step 210, a determination is made whether the received torque command is greater than a predetermined percentage of the peak ISGM torque. If the torque command is greater than the predetermined percentage of the peak, then the fuel injection system is controlled to fuel or refuel the engine 102 at step 211. If not, the system will wait for a new torque command. The remaining steps are the same and will not be described in detail again.

Figure 2D:
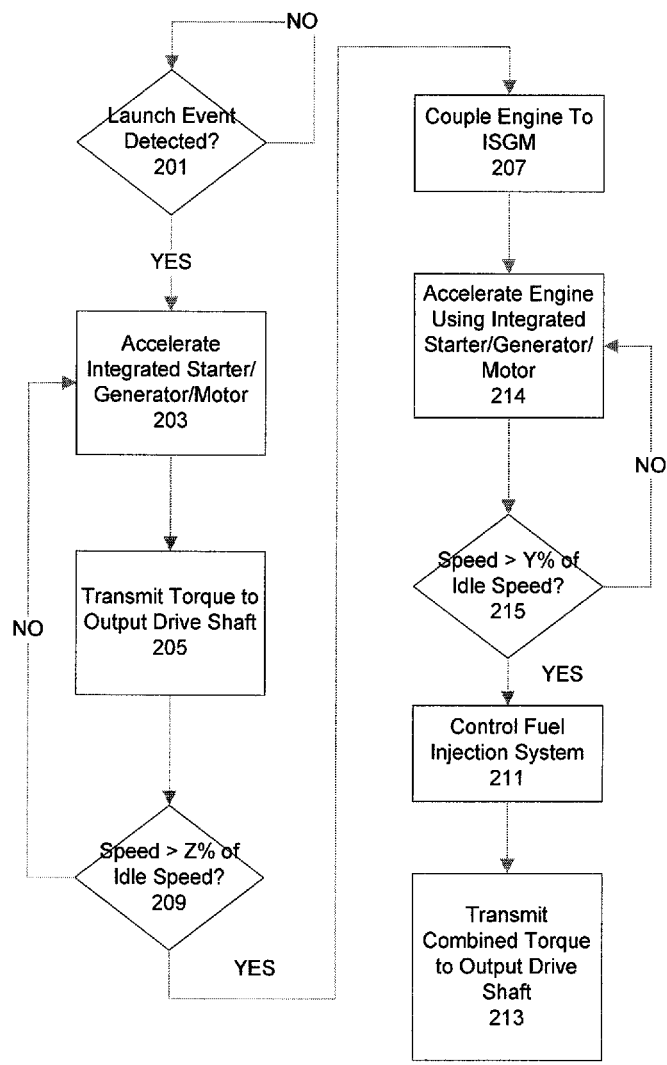

Additionally, a second speed threshold can be used to determine when to refuel or fuel the engine 102. For example, FIG. 2D illustrates a flow chart of an exemplary method in accordance with the invention where a second speed threshold is used. In FIG. 2D steps 207 and 209 are reversed with respect to the method described in FIG. 2A. The ISGM 106 is started and initially accelerated at step 203. After the engine 102 is coupled to the ISGM 106, the ISGM 106 continues to accelerate at step 214. The ISGM is accelerated until a speed is reached that is greater than a second speed threshold relative to the idle speed of the engine. At step 215, a determination is made as to whether the speed is greater than the second speed threshold. If the speed is greater ("YES" at 215), the fuel injection system supplies the engine 102 with fuel or refuels the engine 102 at step 211. If not, the ISGM 106 is allowed to continue to accelerate 214.

Figure 2E:
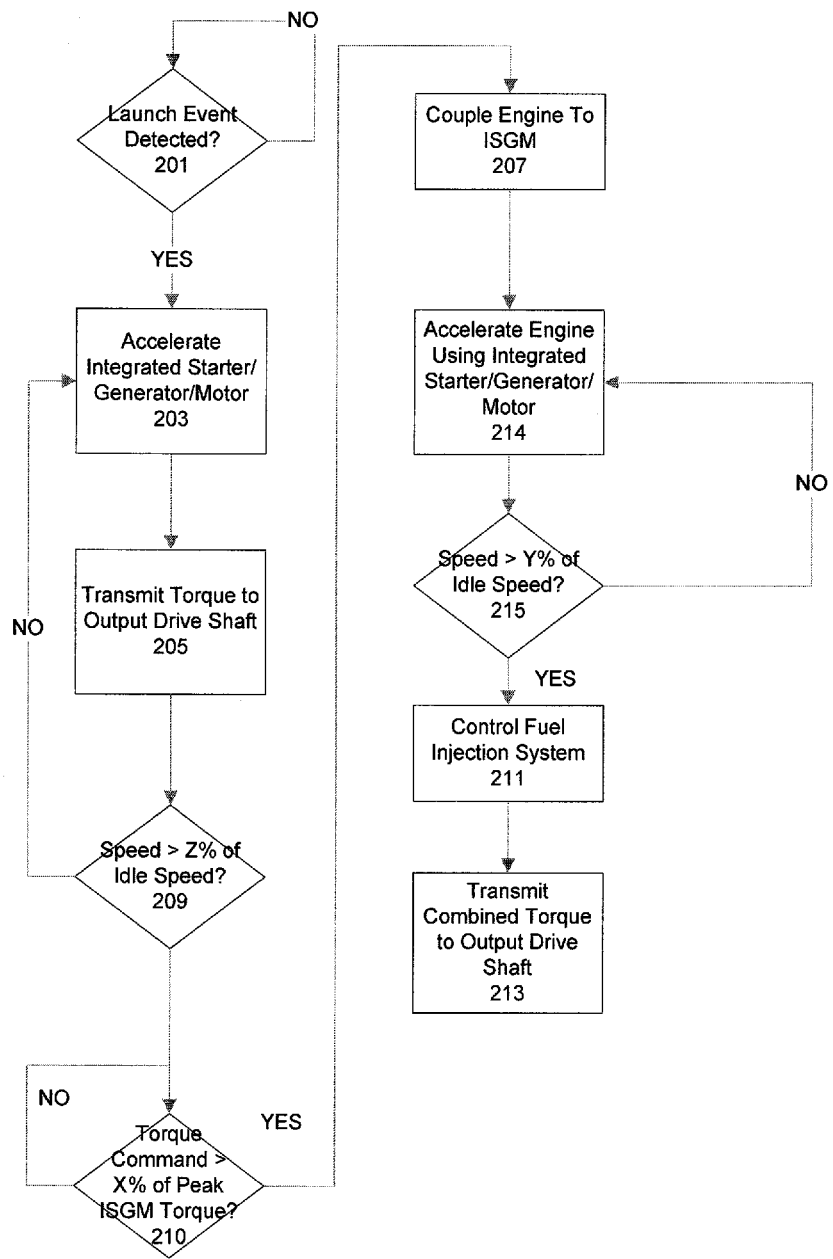

The remaining steps are the same and will not be described in detail again. FIG. 2E illustrates another exemplary method in accordance with the invention. In the method depicted in FIG. 2E, both a second speed threshold and a received torque command and the peak torque for the ISGM 106 are used in the launch process.

Figure 3:
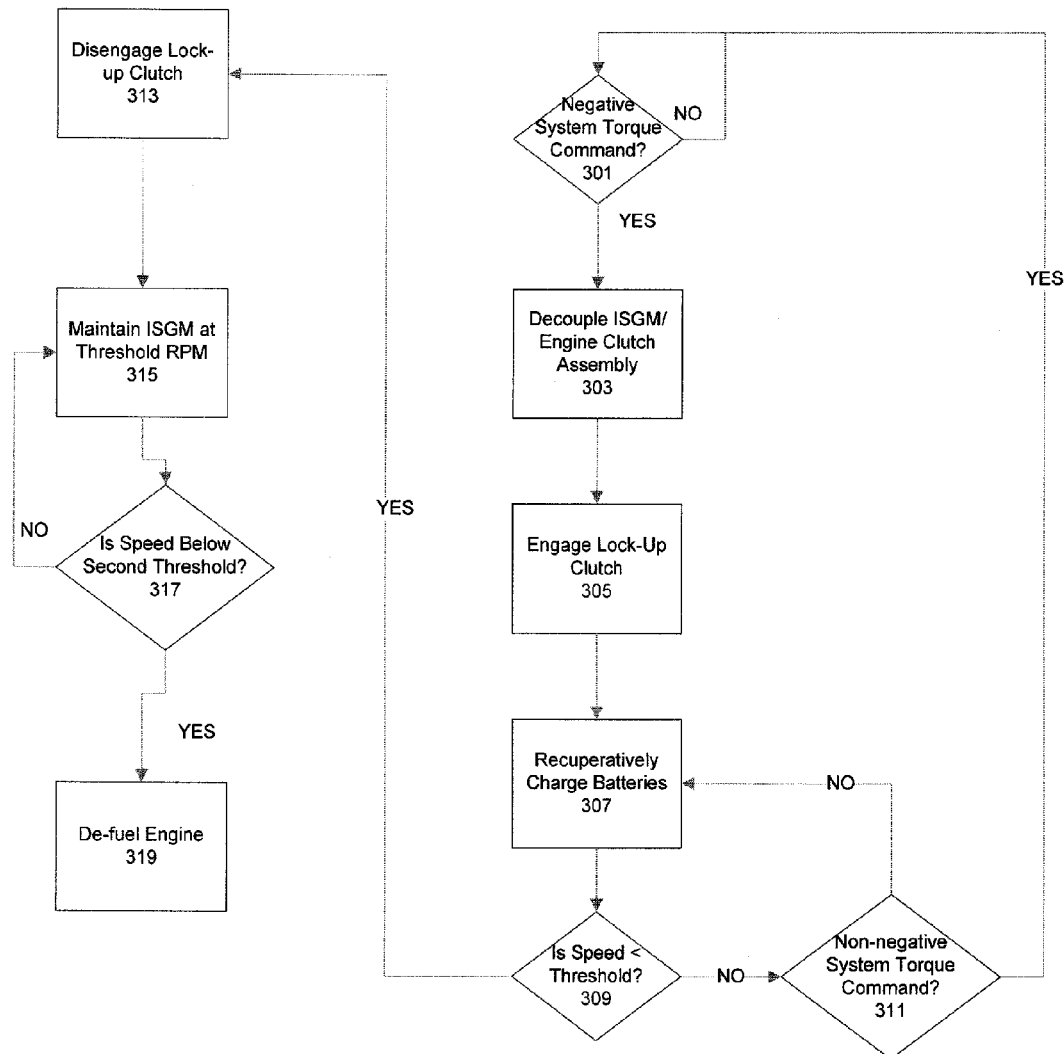
FIG. 3 illustrates a flow diagram illustrating an exemplary process for decelerating a vehicle in accordance with an aspect of the present invention.

FIG. 3 illustrates an exemplary deceleration process for the system depicted in FIG. 1. At step 301, sensors detect negative system torque command. A negative system torque command can be, but is not limited to, an input though an accelerator pedal, brake pedal, combination thereof, or a cruise control device. If the system torque command is negative, the process proceeds to step 303. In step 303 the ISGM 106 and engine 102 are decoupled by disengagement of a clutch assembly 104 disposed between the ISGM 106 and the engine 102. However, if additional negative torque is needed beyond the retarding torque provided by the ISGM 106, step 303 may be skipped, keeping the engine 102 coupled to the ISGM 106.

Additionally, since a torque converter 108 is not designed to transfer power efficiently from the transmission side, the lock-up clutch 114 of the torque converter 108 is engaged during in step 305, if not already engaged. The lock-up clutch 114 allows more efficient transfer of regenerative power from the drive wheels to the ISGM 106.

In FIG. 3, the ISGM 106 and engine 102 are decoupled before the lock-up clutch 114 is engaged. However, step 303 and step 305 can be switched, with the lock-up clutch 114 being engaged prior to the ISGM 106 and engine 102 being decoupled. The particular order in which steps 303 and 305 are executed is dependent on speed, battery state of charge, and throttle signal.

The regenerative power is recouped to charge batteries or other energy storage devices (systems), e.g., energy storage system 118, in step 307. During step 307, speeds are monitored by a controller. If monitored speed(s) is/are above a preset threshold speed, in 309, the process determines if the system torque command is non-negative in step 311. As long as the system torque command is negative and speed is above the threshold speed of step 309, the process continues charging the batteries as described in step 307. However, if the speed is above the threshold of step 309 but system torque command is no longer negative, the process stops charging the batteries and returns to step 301, awaiting the next detection of negative system torque command.

Once the controller determines that the speed is below the threshold speed in step 309, the process proceeds to step 313. In step 313, the lock-up clutch 114 is disengaged. When the lock-up clutch 114 is disengaged, deceleration energy that would have been regenerative power is dissipated through the torque converter 108. The engine 102 may remain disengaged from the ISGM 106, and the engine 102 may be allowed to idle or even shut off. The controller maintains the ISGM 106 at a threshold RPM in step 315. Optionally, when the speed is below the second threshold, the controller may de-fuel the engine 102 in step 319.

The engine 102 can be kept at a low idle speed in step 315 so that power is provided to conventional power steering and power brake systems even when the engine 102 is not providing motive energy to the gearbox 110. Alternatively, the engine 102 can be completely de-fueled and powered off to further increase the fuel efficiency of the hybrid vehicle. However, in order to properly operate the hybrid vehicle with the engine 102 powered off, the conventional mechanically driven power steering and power brake systems are replaced with electrically driven power steering and power brake systems. Use of the electrically driven systems increase cost to the hybrid vehicle.

Figure 4:
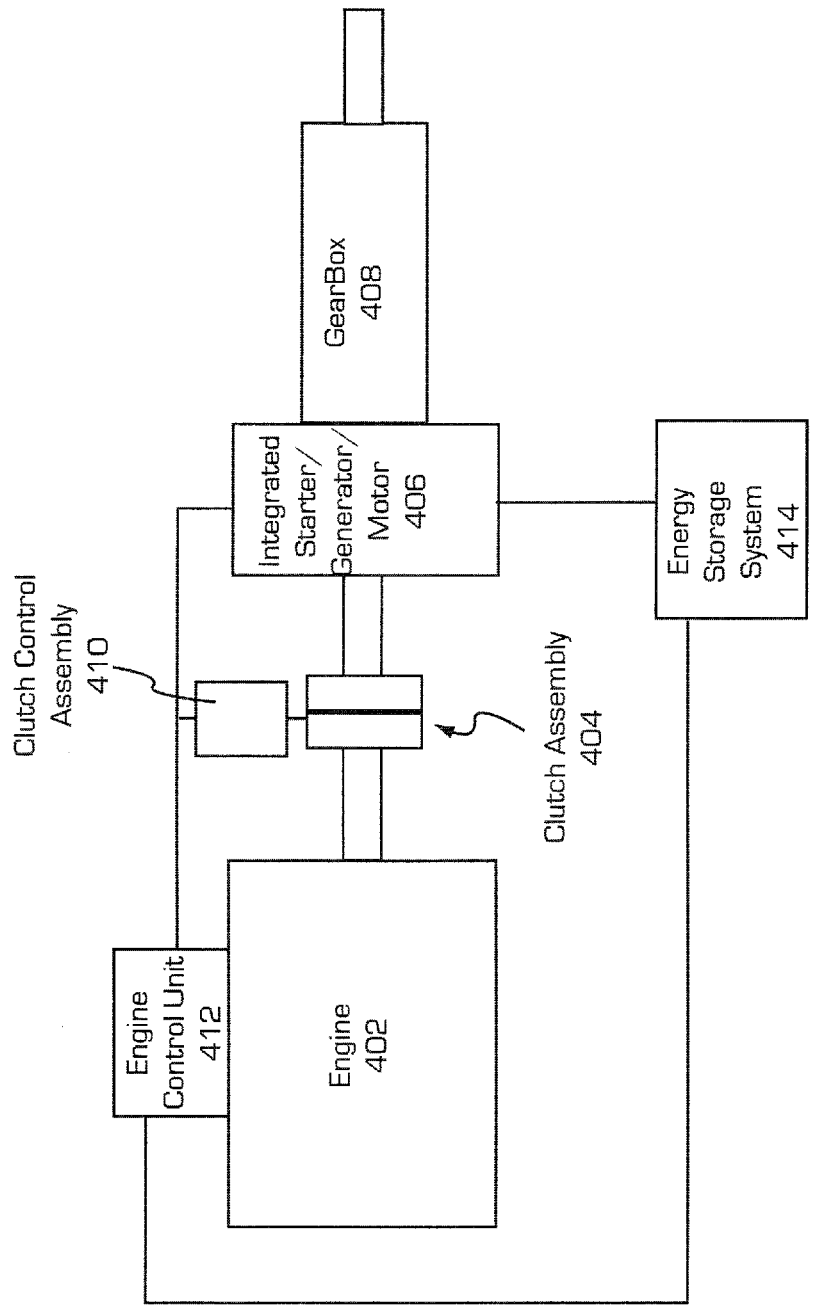
FIG. 4 illustrates a block representation of an additional example of the present invention.

Referring to FIG. 4 an additional example of the present invention is shown in which the automatic transmission, i.e., torque converter 108 and gearbox 110, of FIG. 1 are replaced with a semi-automatic type manual transmission represented by gearbox 408. The drive train system of the present invention includes an internal combustion engine 402 ("engine"), coupled to an integrated starter/generator/motor ("ISGM") 406 by way of a clutch assembly 404. The clutch assembly 404 allows the ISGM 406 to be disengaged from the engine 402 during decelerations and full stops. The clutch assembly 404 is controlled by a clutch control assembly 410. The clutch control assembly 410 is, for example, a hydraulic solenoid controlling engagement and disengagement of the clutch assembly 404 based on the state of the hybrid vehicle. As noted above, the clutch control assembly 410 can be pneumatic or mechanical. In the present invention, the clutch assembly 404 disengages the engine 402 from the ISGM 406 during decelerations.

Additionally, the ISGM 406 is coupled to the gearbox 408. The gearbox 408 is coupled to drive wheels by way of a drive shaft (not shown).

The ISGM 406 is sized to operate efficiently as a traction motor for propelling the vehicle with or without engine assistance up to a cruising velocity. In addition, the ISGM 406 is adapted to provide sufficient rotational torque to rotate the engine crankshaft and propel the vehicle simultaneously.

Moreover, the ISGM 406 operates as a starter engine launch, as a generator during vehicle deceleration, and as a traction motor during acceleration and cruising. As a generator, the ISGM 406 generates electrical energy during the deceleration process by recuperating the mechanical energy of the vehicle. The ISGM 406 is electrically coupled to an energy storage system 414, which may be batteries or ultra capacitors. Co-pending application entitled a Parallel Hybrid Electric Vehicle Power Management System and Adaptive Power Management Method and Program Therefor assigned to BAE Systems Controls, Inc., which is incorporated by reference describes a system and method for charging the energy storage system 414 only using energy from regenerative braking. The energy storage system 414 receives electrical energy from the ISGM 406 operating as a generator during deceleration. The energy storage system 414 provides electrical energy to the ISGM 406 when the ISGM 406 is operating as a starter motor and/or traction motor. Torque from the engine 402 and ISGM 406 is mechanically coupled to the gearbox 408.

Additionally, an engine control unit 412 provides control signals for actuating fuel injectors, fuel pumps and other engine components. Additionally, the engine control unit 112 monitors engine-operating conditions, and may be configured to control operation of the clutch assembly 404 and ISGM 406 based on sensor signals from accelerator and brake pedals in the vehicle cabin. Moreover, the clutch control assembly 414 receives control signals from the engine control unit 412.

The vehicle launch process for the additional example shown in FIG. 4 operates essentially as described above with reference to FIGS. 2A-2E. However, during the initial launch, prior to step 203, the clutch assembly 404 can be engaged, disengaged, or in a slip state where the clutch assembly 404 allows partial transfer of load to the engine 402.

Figure 5A:
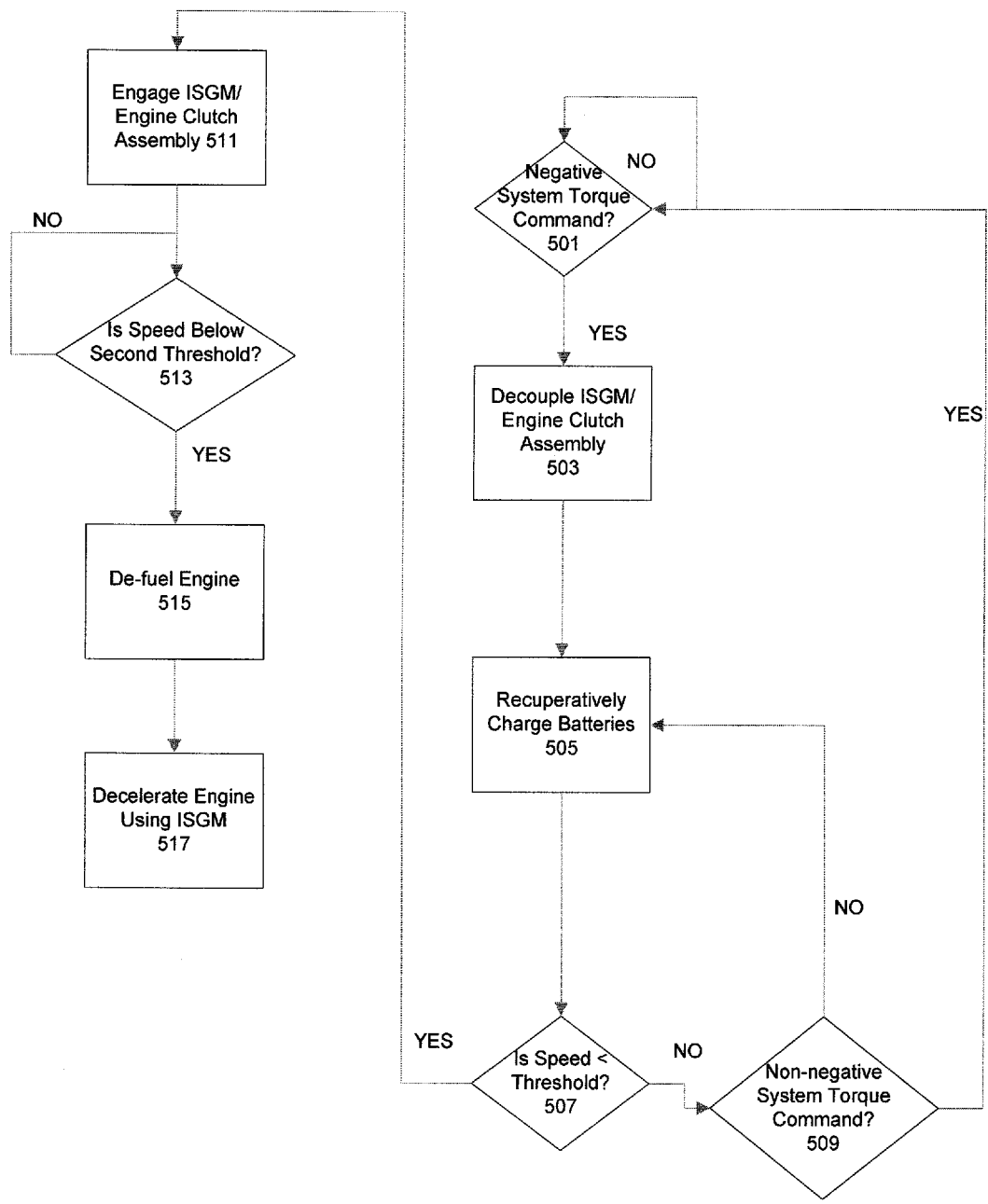
FIGS. 5A and 5B illustrate flow diagrams illustrating two exemplary processes for decelerating a vehicle in accordance with the additional example in FIG. 4.
Figure 5B:
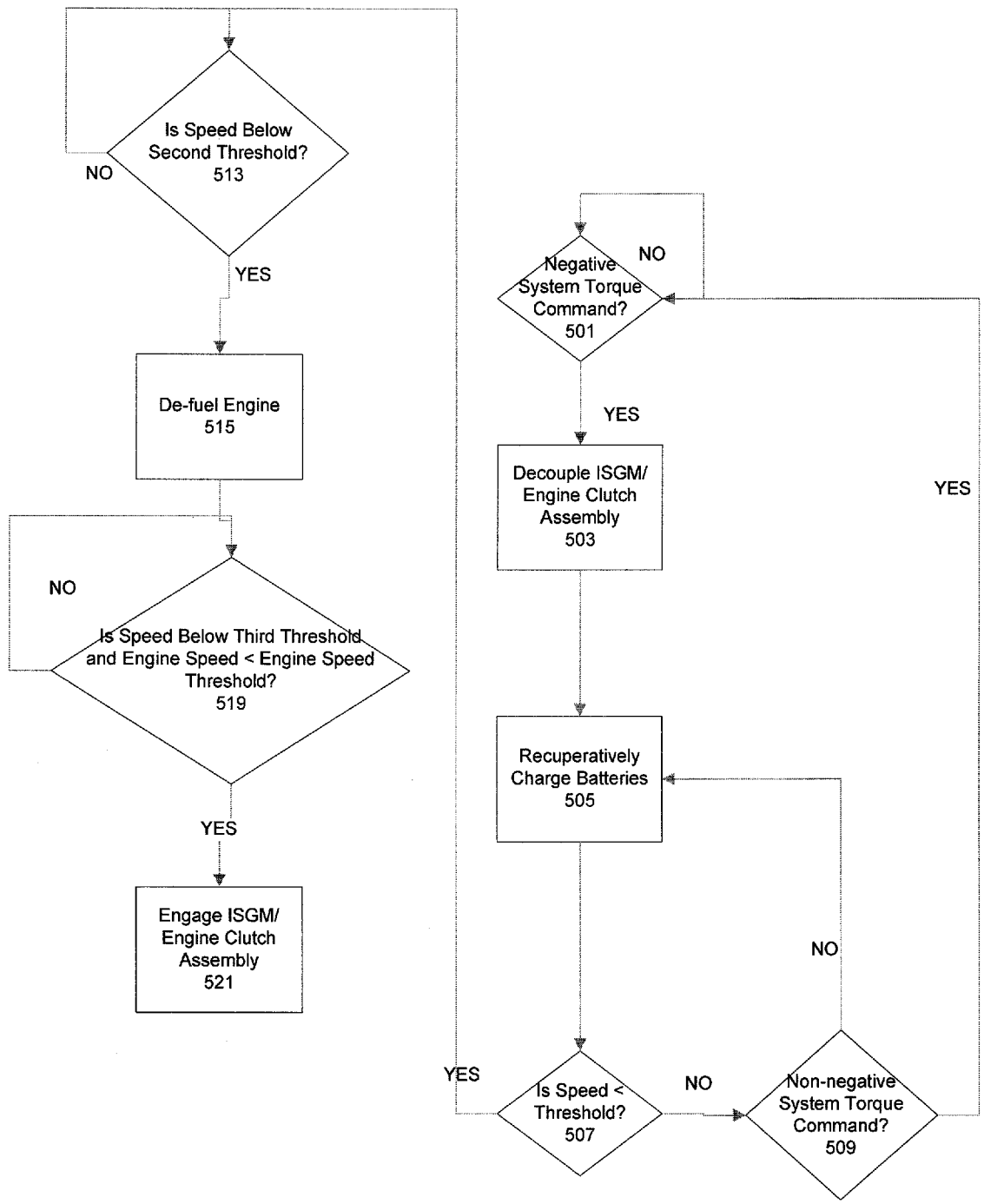

FIGS. 5A and 5B illustrate flow charts of exemplary process for deceleration in accordance with the invention for the additional exemplary system depicted in FIG. 4. In FIG. 5A, at step 501 a sensor detect negative system torque command. If there is a negative system torque command, the process proceeds to step 503. In step 503, the ISGM 406 and engine 402 are decoupled by disengagement of a clutch assembly 404 disposed between the ISGM 406 and the engine 402.

It should be noted that, step 503 can be optionally executed depending on speed, battery state of charge, and throttle signal. Thus, step 503 is not required in all instances of the deceleration process of FIG. 5A or 5B.

The regenerative power is recouped to charge batteries or other energy storage devices (systems), e.g., energy storage system 414 in step 505. During step 505, speeds are monitored by a controller. If the speed(s) is/are above a preset threshold velocity, in 507, the process determines if the system torque command is negative in step 509. As long as the system torque command is negative and speed is above the threshold speed of step 505, the process continues charging the batteries e.g., energy storage system 414, as described in step 505. However, if the speed is above the threshold speed of step 507 but system torque command is no longer negative, the process stops charging the batteries and returns to step 501, awaiting the next negative system torque command.

Once the controller determines that the speed is below the threshold speed in step 507, the process proceeds to step 511. The clutch assembly 404 between the ISGM 406 and the engine 402 is engaged in step 511. Even with the assembly clutch 404 engaged, regenerative power is recouped to charge the energy storage system 414. The charging will be at a reduced rate due to the engine 402 acting as a load. The energy storage system 414 can be charged until a state of charge reaches a target level. Alternatively, in step 511, the engine 402 may remain disengaged from the ISGM 406, and the engine 402 may be allowed to idle or even shut off.

At step 513, a determination is made whether speed is below a second threshold. Optionally, when the speed is below the second threshold in step 513, the controller may de-fuel the engine 402 in step 515. At this point, the ISGM 406 operates as a torsional damper on the engine 402, in step 517, while the engine 402 moves through its first resonance frequency. Thus, the ISGM 406 decelerates the engine 402 using any remaining regenerative energy. Alternatively, the engine can be de-fueled at step 501 if the engine 402 remains decoupled throughout the deceleration process.

Several steps of the process or method illustrated in FIG. 5B are similar to FIG. 5A and will not be described in detail again, for example, steps 501-509 and steps 513-515. Step 511 is not performed in the process illustrated in FIG. 5B. After de-fueling the engine at step 515, a determination is made whether the speed is below a third threshold (at step 519). Additionally, a determination as to whether the engine speed (RPMs) is below an engine speed threshold (also at step 519). If both determinations are "YES", then the engine 402 is coupled to the ISGM 406 at step 521.

Figure 6:
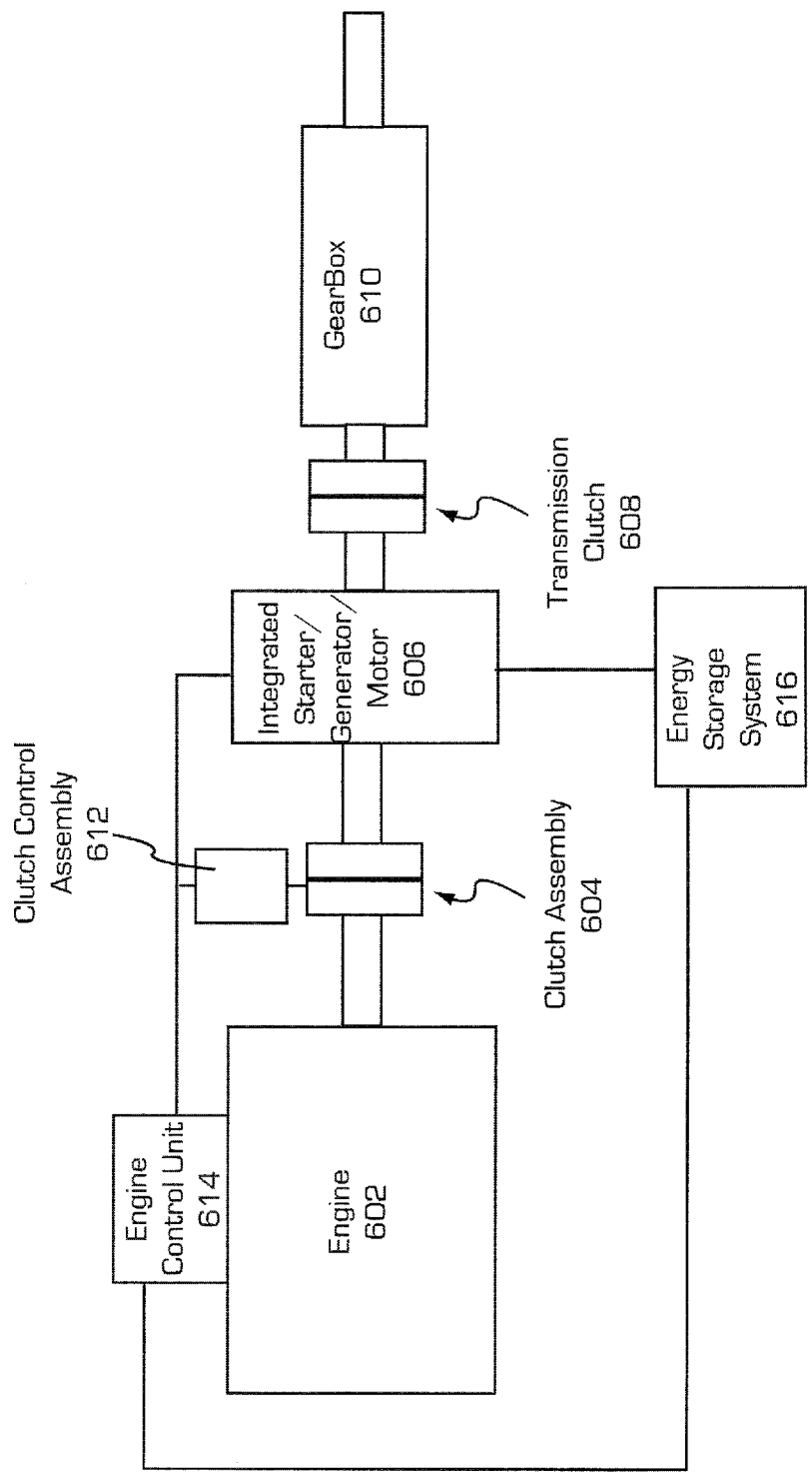
FIG. 6 illustrates a block representation of a second additional example of the present invention.

Referring to FIG. 6 a second additional example of the present invention is shown in which the automatic transmission, i.e., torque converter 108 and gearbox 110, of FIG. 1 are replaced with a traditional manual transmission represented by gearbox 610 and transmission clutch 608, which couples the ISGM 606 to the gearbox 610. The drive train system of the present invention includes an internal combustion engine 602 (the "engine"), coupled to the ISGM 606 by way of a clutch assembly 604. The clutch assembly 604 allows the ISGM 606 to be disengaged from the engine 602 during decelerations and full stops. The clutch assembly 604 is controlled by a clutch control assembly 612. The clutch control assembly 612 is, for example, a hydraulic solenoid controlling engagement and disengagement of the clutch assembly 604 based on the state of the hybrid vehicle. Additionally, the clutch control assembly 612 can be pneumatic or mechanical. In the present invention, the clutch assembly 604 disengages the engine 602 from the ISGM 606 during decelerations.

The ISGM 606 is sized to operate efficiently as a traction motor for propelling the vehicle with or without engine assistance up to a cruising velocity. In addition, the ISGM 606 is adapted to provide sufficient rotational torque to rotate the engine crankshaft and propel the vehicle simultaneously.

Moreover, the ISGM 606 operates as a starter engine launch, as a generator during vehicle deceleration, and as a traction motor during acceleration and cruising. As a generator, the ISGM 606 generates electrical energy during the deceleration process by recuperating the mechanical energy of the vehicle. The ISGM 606 is electrically coupled to an energy storage system 616, which may be batteries or ultra capacitor. Co-pending application entitled a Parallel Hybrid Electric Vehicle Power Management System and Adaptive Power Management Method and Program Therefor assigned to BAE Systems Controls, Inc., which is incorporated by reference describes a system and method for charging the energy storage system 616 only using energy from regenerative braking. The energy storage system 616 receives electrical energy from the ISGM 606 operating as a generator during deceleration. The energy storage system 616 provides electrical energy to the ISGM 606 when the ISGM 606 is operating as a starter motor and/or traction motor. Torque from the engine 102 and ISGM 106 is mechanically coupled to the transmission clutch 608.

Additionally, an engine control unit 614 provides control signals for actuating fuel injectors, fuel pumps and other engine components. Additionally, the engine control unit 614 monitors engine-operating conditions, and may be configured to control operation of the clutch assembly 604 and ISGM 606 based on sensor signals from accelerator and brake pedals in the vehicle cabin. Moreover, the clutch control assembly 612 receives control signals from the engine control unit 614.

The vehicle launch process for the second additional example shown in FIG. 6 operates essentially as described above with reference to FIGS. 2A-2E. However, during the initial launch, prior to step 203, the clutch assembly 604 can be engaged, disengaged, or in a slip state where the clutch assembly 604 allows partial transfer of load to the engine 602.

Figure 7A:
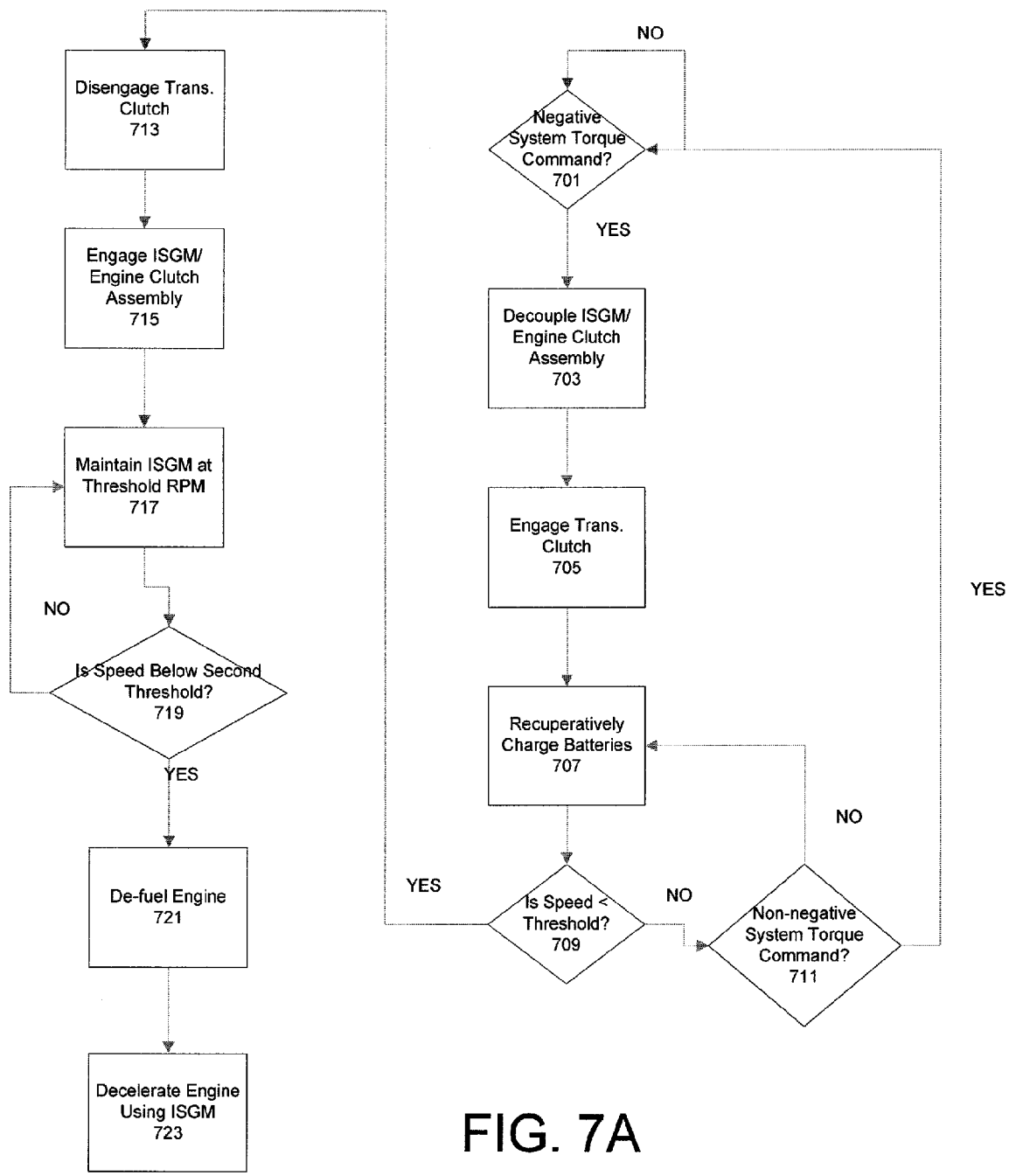
FIGS. 7A and 7B illustrate flow diagrams illustrating two exemplary processes for decelerating a vehicle in accordance with the second additional example in FIG. 6.
Figure 7B:
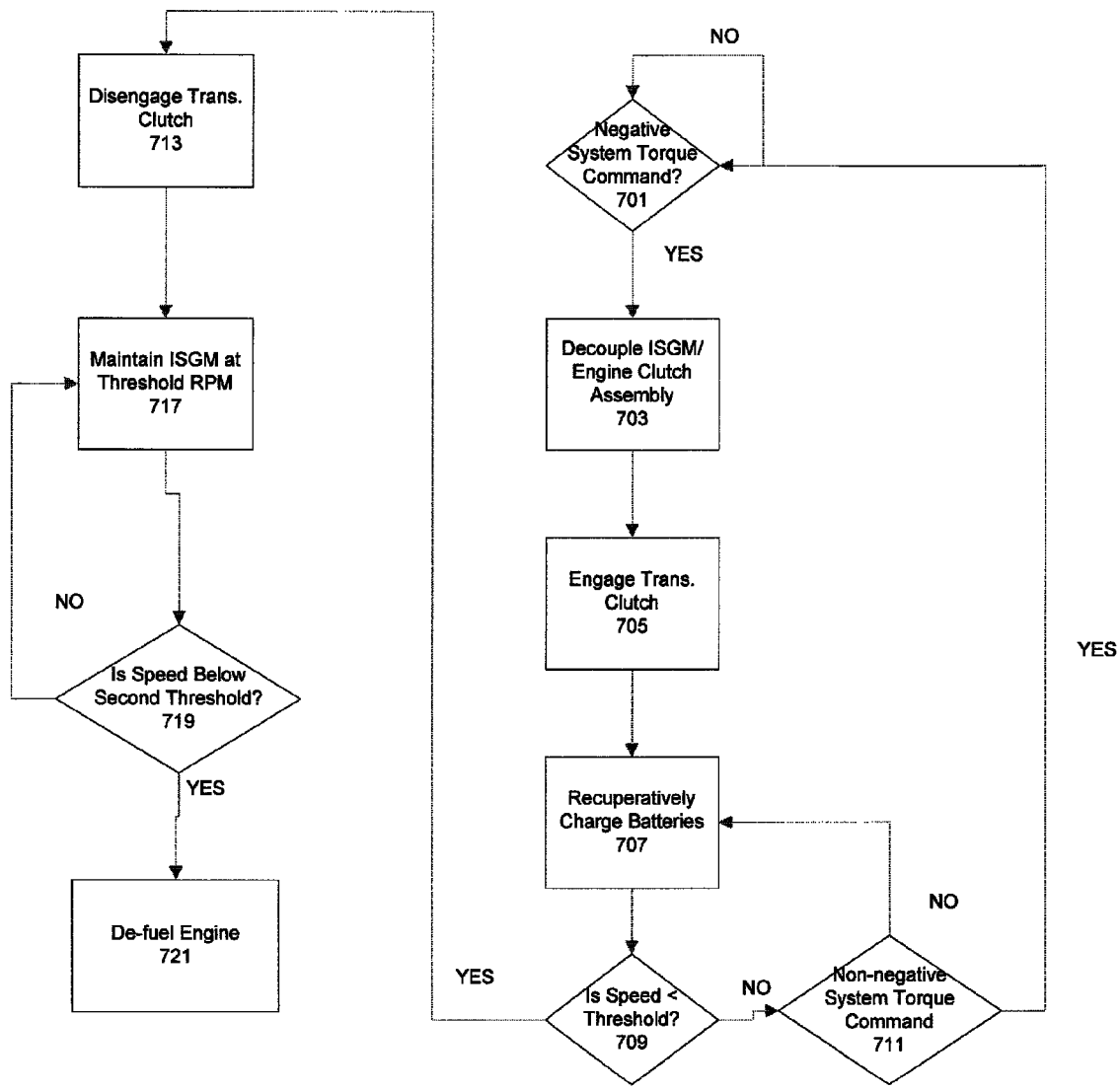

FIGS. 7A and 7B illustrate two exemplary deceleration processes for the second additional example. As depicted in FIG. 7A or 7B, at step 701 sensors detect a negative system torque command. If the system torque command is negative, the process proceeds to step 703. In step 703, the ISGM 606 and engine 602 are decoupled by disengagement of the clutch assembly 604 disposed between the ISGM 606 and the engine 602.

It should be noted that, step 703 can be optionally executed depending on speed, battery state of charge, and throttle signal. Thus, step 703 is not required in all instances of the deceleration process of FIG. 7A or 7B.

The process continues to step 705 where the transmission clutch 608 is engaged between the ISGM 606 and the gearbox 610, if the transmission clutch 608 is not already engaged. The regenerative power is recouped to charge batteries or other energy storage devices (systems), e.g., energy storage system 616 in step 707. During step 709, speeds are monitored by a controller. If a speed is above a preset threshold speed, in 709, the process determines if the system torque command is negative in step 711. As long as the system torque command is negative and the speed is above the threshold speed of step 709, the process continues charging the batteries e.g., energy storage system 616, as described in step 707. However, if the speed is above the threshold speed of step 707 but system torque command is not negative, the process stops charging the batteries and returns to step 701, awaiting the next detection of negative system torque command.

Once the controller determines that the speed is below the threshold speed in step 709, the process proceeds to step 713. The transmission clutch 608 is disengaged in step 713. Alternatively, in step 713, the ISGM 606 may remain engaged to the gearbox 610. The clutch assembly 616 between the ISGM 606 and the engine 602 is engaged in step 715. Alternatively, in step 715, the engine 602 may remain disengaged from the ISGM 606, and the engine 602 may be allowed to idle or even shut off. For example, FIG. 7B illustrates the process without coupling the ISGM 606 and engine 602 via clutch assembly 616 at step 715. The controller maintains the ISGM 606 at a threshold RPM in step 717 until the speed is detected below a second threshold in step 719.

Optionally, when the speed is below the second threshold in step 719, the controller may de-fuel the engine 602 in step 721. At this point, the ISGM 606 operates as a torsional damper on the engine 602, in step 723, while the engine 602 moves through its first resonance frequency. Thus, the ISGM 606 decelerates the engine 602. Alternatively, the engine 602 can be de-fueled at step 701 if the engine 602 remains decoupled throughout the deceleration process.

The process illustrated in FIG. 7B is similar to the process illustrated in FIG. 7A except that steps 715 and 723 are omitted. The engine 602 and the ISGM 606 are not coupled in FIG. 7B.

In the proceeding descriptions of the systems and processes involved in examples of the present invention, the control systems as referred to as a singular controller or an engine control unit. However, in practice the control functions of the present invention may be performed by a single engine control unit or by multiple controllers performing discrete portions of the control functions described above.

The described examples of the present invention are intended to be illustrative rather than restrictive, and are not intended to represent every embodiment or example of the present invention. Various modifications and variations can be made without departing from the spirit or scope of the invention as set forth in the following claims both literally and in equivalents recognized in law.

What is claimed is:

1. A method of controlling the operation of a parallel hybrid electric vehicle, comprising an engine, a first clutch, an integrated starter/generator/motor (ISGM) coupled to said engine in accordance with the operating state of said first clutch, a combination of a torque converter and a second clutch connected in parallel therewith, said combination being mechanically coupled between said ISGM and an output drive shaft that propels the vehicle, and an energy storage device electrically coupled to said ISGM, comprising:
   transmitting electrical energy from said energy storage device to said ISGM, wherein said ISGM functions as a motor having an output torque, wherein said ISGM is commanded to a predefined percentage of maximum torque of said ISGM;
   transmitting a portion of the output torque from said ISGM through said torque converter to the output drive shaft to launch the vehicle; and
   operating said first clutch to enable a remaining portion of the output torque of said ISGM to be coupled to said engine to enable the starting of said engine.

2. The method according to claim 1, further comprising detecting a launch even prior to transmitting electrical energy.

3. The method according to claim 1, wherein during the transmitting electrical energy, said ISGM is accelerated to a predefined percentage of the idle speed of said engine.

4. The method according to claim 1, wherein a gear box is positioned between said combination and the output drive shaft.

5. The method according to claim 4, wherein after the starting of said engine, an output torque from said engine is combined with the output torque from said ISGM as the combined torques are transmitted through said torque converter and said gear box to the output drive shaft to accelerate the launching of the vehicle.

6. The method according to claim 1, wherein said second clutch is a lock-up clutch.

7. The method according to claim 6, wherein after the launched vehicle reaches a first threshold speed, said lock-up clutch is engaged to enable the output torque from said engine and said ISGM to be coupled through said lock-up clutch and said gear box to the output drive shaft to provide sufficient power to further accelerate the vehicle.

8. A method for operating an engine in a parallel hybrid vehicle, comprising an engine, a first clutch, an integrated starter/generator/motor (ISGM) coupled to said engine in accordance with the operating state of said first clutch, a combination of a torque converter and a second clutch connected in parallel therewith, said combination being mechanically coupled between the ISGM and an output drive shaft that propels the vehicle, and an energy storage device electrically coupled to the ISGM, comprising:
   operating said first clutch to disengage said engine from said ISGM during an initial deceleration phase of a vehicle;
   engaging said second clutch during the initial deceleration phase to direct substantially all regenerative energy from the decelerating vehicle therethrough to said ISGM operating as a generator to provide the only source of electrical energy to recharge said energy storage device, and disengaging said second clutch at the later deceleration phase to direct any remaining regenerative energy through said torque converter, and
   operating the ISGM as a torsional dampener on the engine during the final deceleration phase.

9. The method as in claim 8, wherein the second clutch is a lock-up clutch.

10. The method as in claim 8, further comprising maintaining the ISGM at an idle speed during the later deceleration phase.

11. The method as in claim 8, further comprising:
   defueling the engine during a final deceleration phase in which a velocity is at zero.

12. An engine control system for a parallel hybrid vehicle, the control system comprising:
   an internal combustion engine;
   a first clutch;
   an integrated starter/generator/motor (ISGM) coupled to said internal combustion engine by way of said first clutch;
   a rechargeable energy storage system providing electrical energy to said ISGM;
   a gearbox coupled to an output drive shaft of the vehicle;
   a torque converter mechanically coupled between said ISGM and said gearbox;
   a lock-up clutch disposed in parallel with the torque converter, said lock-up clutch having an operation mode in which actuation of said lock-up clutch is controlled independent of operational conditions of said torque converter;
   a controller adapted for generating control signals, the control signals controlling operation of said lock-up clutch, said ISGM, said first clutch, and said internal combustion engine,
   wherein said controller operates said first clutch to disengage said engine from said ISGM during an initial deceleration phase of said vehicle; and engages said lock-up clutch during said initial deceleration phase to direct substantially all regenerative energy from said decelerating vehicle therethrough to said ISGM operating as a generator to provide the only source of electric energy to recharge said rechargeable energy storage system, and disengages said lock-up clutch at the later deceleration phase of the vehicle to direct any remaining regenerative energy through said torque converter, and
   wherein the controller transmits electrical energy from said rechargeable energy storage system to said ISGM, where said ISGM functions as a motor having an output torque; transmitting a portion of the output torque from said ISGM through said torque converter to the output drive shaft to launch the vehicle; and operates said first clutch to enable a remaining portion of the output torque of said ISGM to be coupled to said engine to enable the starting of said engine when launching the vehicle.

13. The system as in claim 12, wherein said ISGM is adapted to operate as a starter during an engine launch operation of a vehicle, as a generator during deceleration of the vehicle, and as a primary traction motor during acceleration and cruising of the vehicle.

14. The system as in claim 12, wherein said rechargeable energy storage system includes at least one of a battery, or a fuel cell.

15. The system as in claim 12, wherein said lock-up clutch is actuated by control of one or more control devices electronically controlled by said control signals received from said controller.

16. A method for controlling the operation of a parallel hybrid electric vehicle, comprising an engine, a first clutch, an integrated starter/generator/motor (ISGM) coupled to said engine in accordance with the operating state of said first clutch, and an energy storage device electrically coupled to the ISGM, comprising:
operating said first clutch to disengage said engine from said ISGM during an initial deceleration phase of a vehicle;
directing substantially all regenerative energy from the decelerating vehicle therethrough to said ISGM operating as a generator to provide the only source of electrical energy to recharge said energy storage device at a first deceleration phase; and
operating said first clutch to couple said engine to said ISGM at a later deceleration phase in which a velocity is below a threshold velocity.

17. The method for operating an engine in a parallel hybrid electric vehicle according to claim 16, further comprising:
using said ISGM to decelerate said engine.

18. A method of controlling the operation of a parallel hybrid electric vehicle, comprising an engine, a first clutch, an integrated starter/generator/motor (ISGM) coupled to said engine in accordance with the operating state of said first clutch, and an energy storage device electrically coupled to said ISGM, comprising:
transmitting electrical energy from said energy storage device to said ISGM using only energy recovered via regenerative energy from deceleration of the parallel hybrid electric vehicle, wherein said ISGM functions as a motor having an output torque;
transmitting a portion of the output torque from said ISGM to the output drive shaft to launch the vehicle; and
operating said first clutch to enable a remaining portion of the output torque of said ISGM to be coupled to said engine to enable the starting of said engine.

19. The method of controlling the operation of a parallel hybrid electric vehicle according to claim 18, further comprising:
detecting a launch event.

20. The method of controlling the operation of a parallel hybrid electric vehicle according to claim 18, wherein during the transmitting of electrical energy, said ISGM is accelerated to a predefined percentage of the idle speed of said engine.

21. The method of controlling the operation of a parallel hybrid electric vehicle according to claim 20, wherein said operating said first clutch occurs when said ISGM is accelerated to a predefined percentage of the idle speed of said engine.

22. The method of controlling the operation of a parallel hybrid electric vehicle according to claim 20, wherein said operating said first clutch occurs prior to said ISGM being accelerated to a predefined percentage of the idle speed of said engine.

23. The method of controlling the operation of a parallel hybrid electric vehicle according to claim 20, further comprising:
receiving a torque command;
comparing said received torque command with a peak torque of said ISGM, wherein said operating said first clutch is based upon said comparing.

24. The method of controlling the operation of a parallel hybrid electric vehicle according to claim 20, further comprising: controlling a fuel supply to said engine at least based upon the acceleration of said ISGM.

25. The method of controlling the operation of a parallel hybrid electric vehicle according to claim 24, further comprising accelerating said ISGM until a second predefined percentage of idle speed of said engine, wherein said controlling is performed after said ISGM reaches said second predefined percentage of idle speed of said engine.

* * * * *